Patented Feb. 19, 1935

1,991,779

UNITED STATES PATENT OFFICE 1,991,779

MANUFACTURE OF GUM INHIBITED MOTOR FUELS

Eugene Ayres, Swarthmore, Pa., assignor to Gulf Refining Company, Pittsburgh, Pa., a corporation of Texas No Drawing. Application October 26, 1931, Serial No. 571,291

13 Claims. (Cl. 44—9)

This invention relates to manufacture of gum inhibited motor fuels; and it comprises (1) as a gum inhibitor for motor fuels, an oxidation product of alpha-naphthol, such as the new compound peri-monoxynaphthalene, (2) a process of preparing said oxidation product, (3) an improved motor fuel carrying a small proportion of said oxidation product and (4) a process of inhibiting gum formation in motor fuels such as gasoline, wherein such fuel in a fresh or newly made condition is treated prior to storage by dissolving therein a minimal amount of an oxidation product of alpha-naphthol, for example, peri-monoxynaphthalene; all as more fully hereinafter set forth and as claimed.

In my prior and copending application, Serial No. 561,813, filed September 8, 1931, I have described and claimed the addition of various gum inhibiting and gum retarding agents to motor fuels, these agents possessing the property of increasing the so-called gum induction period and of decreasing the rate of gum formation subsequent to said induction period. The present invention represents, in some particulars, an extension of and improvement upon this work.

I have found certain new agents which not only show excellent gum inhibiting action by extending the gum induction period but in addition greatly decrease the amount of gum formed during this period. The so-called "gum induction period" of a motor fuel is determined during the usual "oxygen stability test". A sample of the fuel is placed in a bomb under a pressure of 100 pounds per square inch of oxygen. The bomb is then heated by immersion in boiling water. The increase of temperature causes the pressure to rise to a maximum point determined largely by the volatility of the material being tested. After reaching this maximum the pressure gradually falls during the test. The time at which the bomb is first immersed in the boiling water is recorded. The pressure is also recorded at regular intervals, say every 15 minutes. The time interval between the start of the test and the time at which the pressure has fallen 5 pounds below its maximum is termed the "gum induction period".

In ordinary practice the oxygen stability test is conducted over a period not exceeding four hours. When the induction period extends over the entire duration of the test the amount of gum formed has been hitherto considered as having no particular significance. A motor fuel having an induction period of over 4 hours has been considered sufficiently stable for all purposes. When the induction period extends less than the 4 hours of the test the amount of gum found at the end of the test is of value in determining the rate of gum formation after the induction period, as stated in my acknowledged copending application.

I have found that the amount of gum formed during the induction period, even when this period extends beyond the 4 hours of the test is a valuable measure of the effectiveness of gum inhibitors. It is a useful measure of the stability in storage of a motor fuel and of the relative effectiveness of different reagents used to confer stability upon an otherwise unstable motor fuel. Moreover, I have found that gum inhibitors of a certain specified class are particularly effective in reducing the amount of gum formed during the induction period. One of these inhibitors is apparently a new compound not previously described in the literature.

Several prior investigators have reported in the literature that di-alpha-naphthol is obtained when alpha-naphthol is lightly oxidized. In one of my experiments, wherein alpha-naphthol was boiled for one hour with a 20 per cent solution of ferric chloride and after the unreacted alpha-naphthol had been sublimed from the precipitate, I found that there were two different compounds present in the residue. Part of the material was soluble in hot benzene. Out of 500 grams of starting material, 400 grams of the residue was soluble while about 50 grams remained undissolved. This insoluble fraction was found by analytical test to correspond to di-alpha-naphthol said to be formed by prior investigators. The material soluble in the benzene upon test was found to be neither di-alpha-naphthol nor unreacted alpha-naphthol. This material was carefully studied as to its properties in order to establish its structure.

The crude material, recovered from the benzene extract as above, was found to have a melting point, by the capillary tube method, of 230° C. Its ultimate analysis showed carbon, 84.02 per cent; hydrogen, 4.78 per cent and oxygen 11.2 per cent. Standard tests for the presence of phenol, carboxylic, ether, aldehyde, peroxide and quinone groups were all negative. However, upon reaction with hot 10 per cent sodium hydroxide solution the product showed a positive test for phenols. Upon reduction with metallic sodium and amyl alcohol a solid with a melting point of 68°-75° C. was obtained. This product also showed a positive test for phenol.

After purification by several recrystallizations from benzene-pentane solution the following constants for the above product were obtained:

|  | Found | Theory for peri-monoxynaphthalene |
|---|---|---|
| Melting point: °C. (capillary tube method) | 300+ | |
| Ultimate analysis; % by wt.— | | |
| Carbon | 84.10 | 84.45 |
| Hydrogen | 4.69 | 4.28 |
| Oxygen | 11.21 | 11.27 |
| Molecular weight | 146 | 142 |
| Picrate | Red amorphous. | |
| Melting point: °C. (capillary tube method) | 81 | |
| Reduction product— | | |
| Melting point: °C. (capillary tube method) | 70 | 69 |
| Reaction with water under pressure— | | |
| Melting point: °C. (capillary tube method) | 138 | 140 |
| Solubility— | | |
| Water | Insoluble | |
| Benzene | Soluble | |
| Alcohols | Soluble | |
| Chloroform | Soluble | |

On the basis of the above tests, it is indicated that the benzene soluble, non-phenolic product formed during the oxidation of alpha-naphthol with 20 per cent ferric chloride is peri-monoxynaphthalene with the following probable structure:

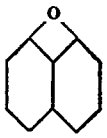

The theoretical values for this compound are given in the last column of the above table for comparison.

A product of the above structure would be likely, upon reduction, to give alpha-tetrahydro-naphthol, according to the following equation:

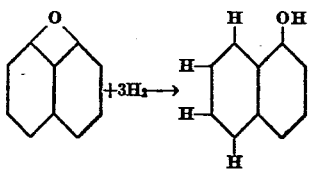

Alpha-tetrahydro-naphthol is said to have a melting point of 69° C. In comparison, the melting point of the product obtained by reducing the purified benzene extracted material obtained above (by treatment of an amyl alcohol solution with metallic sodium) was found to be 70° C.

In addition a product corresponding in structure to peri-monoxynaphthalene would probably produce 1:8-dihydroxynaphthalene upon hydrolysis with boiling water. As a matter of fact when the purified benzene extracted material obtained above was hydrolyzed in boiling water, the reaction being catalyzed by a trace of sodium bicarbonate, a compound having a melting point of 138° C. was obtained. This is in comparison with a melting point of 140° C. for 1:8-dihydroxynaphthalene.

The molecular weight of the benzene soluble product of my present invention, as determined by the boiling point method using methyl salicylate as a solvent, was found to be 145. Using the freezing point depression method and phenol as a solvent a value of 147 was obtained. The theoretical molecular weight of peri-monoxynaphthalene is 142.

If there is in reality a compound of the structure of peri-monoxynaphthalene this should be capable of preparation from 1:8-dihydroxynaphthalene, according to the following reaction:

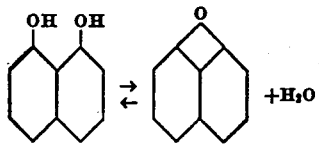

This reaction is a dehydration.

In order to test this point I heated 1:8-dihydroxynaphthalene at about 300° C. under an atmosphere of carbon dioxide, to avoid oxidation. The material which was originally melted lost water and gradually became solid. This solid material was found by test to conform closely with all the tests shown above for the benzene soluble oxidation product of alpha-naphthol.

Although I consider that the above tests indicate strongly that the structure of the benzene soluble oxidation product of alpha-naphthol corresponds to peri-monoxynaphthalene, I do not wish to be limited in the uses of this material to any structural theory. When I use the term "oxidation product of alpha-naphthol" I intend to include di-alpha-naphthol as well as the benzene soluble material which I have apparently identified as peri-monoxynaphthalene. Since the "benzene soluble oxidation product of alpha-naphthol" and the "dehydration product of 1:8-dihydroxynaphthalene" are apparently identical, these two expressions can be used synonymously.

Whatever the structure of the compounds produced upon the oxidation of alpha-naphthol, I have found that the crude product containing both the benzene soluble and insoluble material as well as small impurities of unreacted alpha-naphthol is advantageous as a gum inhibitor in various motor fuels such as gasoline, benzol, etc. The benzene soluble material itself, which I consider to be crude peri-monoxynaphthalene, appears to be a somewhat better inhibitor although the difference, if any, is small. The benzene insoluble material, namely di-alpha-naphthol is also effective to the slight extent to which it may be dissolved in a motor fuel. There appears to be no detectable difference between the crude peri-monoxynaphthalene and the highly purified product (free from alpha-naphthol and from benzene insoluble material), nor does there appear to be any difference in the inhibiting action between these products and the dehydration product of 1:8-dihydroxynaphthalene.

As stated previously the above products appear to be particularly efficacious in reducing the amount of gum formed during the induction period of gum formation as determined by the oxygen stability test. To demonstrate this point I will cite the results of two specific experiments.

*Example 1.*—Two portions of an unstable cracked gasoline were prepared by dissolving therein 0.005 per cent by weight (1) of alpha-naphthol and (2) of peri-monoxynaphthalene formed by the oxidation of alpha-naphthol. At the end of 142 days the sample containing alpha-naphthol showed an oxygen stability period of over 240 minutes (this being the usual duration of the test) and the gum after the completion of the oxygen stability test amounted to 82 mg. per 100 ml. The sample containing peri-monoxynaphthalene after 195 days had an oxygen stability period of over 240 minutes and the gum found after the oxygen stability test was only 19 mg. per 100 ml.

*Example 2.*—Two portions of an unstable cracked gasoline were prepared by dissolving therein 0.005 per cent by weight (1) of alpha-naphthol and (2) of peri-monoxynaphthalene formed by the dehydration of 1:8-dihydroxynaphthalene. At the end of 175 days the alpha-naphthol sample showed a preformed gum of 4 mg. per 100 ml., while the peri-monoxynaphthalene sample after 185 days showed a preformed gum of only 2 mg. per 100 ml.

Thus, while alpha-naphthol is an effective agent for increasing the duration of the induction period, it is not nearly as effective as peri-monoxynaphthalene in reducing the amount of gum formed during this period. This is, to say the least, a surprising result.

I have found that concentrations ranging between 0.01 and 0.0005 per cent by weight are effective in increasing the induction period of motor fuels. Generally a concentration of a few thousandths of 1 per cent is sufficient for all purposes. An addition as small as 0.001 per cent is in some cases sufficient to increase the induction period of the motor fuel as much as 300 per cent.

I have found several different methods of preparing peri-monoxynaphthalene both by oxidation from alpha-naphthol and by dehydration from 1:8-dihydroxynaphthalene. In one particular experiment I took 500 grams of alpha-naphthol and boiled this for one hour in 8 liters of an aqueous solution containing 20 per cent ferric chloride. The precipitate which was formed during the boiling operation was collected by filtration and dried. It was then held at 100° C. for several hours. The unreacted alpha-naphthol was sublimed from the dried precipitate during this heating step. (This may be collected as a crystalline sublimate for reentry into the first step of the process.) After the sublimation step the solid residue free from alpha-naphthol was extracted with hot benzene. About 400 grams was found to dissolve in the benzene, leaving 50 grams as an insoluble residue. The benzene extract may, of course, be added directly to the motor fuel or it can be evaporated to recover the peri-monoxynaphthalene as such. Upon evaporation of the above benzene solution crude peri-monoxynaphthalene remained as a more or less amorphous material. A yield of 80 per cent was obtained in this experiment.

Another more simple method of oxidizing alpha-naphthol with the formation of peri-monoxynaphthalene is to employ a dilute aqueous ferric chloride solution as an oxidizing medium at room temperatures. If alpha-naphthol is added to such a solution and if air is blown through to reoxidize any reduced ferric chloride, a satisfactory yield of peri-monoxynaphthalene is obtained. Aqueous solutions of other ferric salts, such as the sulfate, may be employed.

While the above may not be the best methods of preparing my new compound, at least they are suitable methods for preparing a highly efficient inhibiting agent.

What I claim is:

1. In the manufacture of gum inhibited cracked gasolines normally subject to gum formation, the process which comprises adding to said gasolines a small percentage of an oxidation product of alpha-naphthol.

2. In the manufacture of gum inhibited cracked gasolines normally subject to gum formation, the process which comprises adding to said gasolines a small percentage of a benzene soluble oxidation product of alpha-naphthol.

3. In the manufacture of gum inhibited cracked gasolines normally subject to gum formation, the process which comprises adding to said gasolines a small percentage of a dehydration product of a 1:8-dihydroxynaphthalene.

4. In the manufacture of gum inhibited cracked gasolines normally subject to gum formation, the process which comprises oxidizing alpha-naphthol with an aqueous solution of a ferric salt, extracting the oxidation product with benzene and adding a small proportion of said extract to said gasolines.

5. In the manufacture of gum inhibited cracked gasolines normally subject to gum formation, the process which comprises adding to said gasolines a small percentage of di-alpha-naphthol.

6. In the manufacture of gum inhibited cracked gasolines normally subject to gum formation, the process which comprises adding to said gasoline a small percentage of peri-monoxynaphthalene.

7. A normally gum forming cracked gasoline stabilized by containing a small proportion of an oxidation product of alpha-naphthol.

8. A normally gum forming cracked gasoline stabilized by containing a small proportion of a benzene soluble oxidation product of alpha-naphthol.

9. A normally gum forming cracked gasoline stabilized by containing a small proportion of a dehydration product of 1:8-dihydroxynaphthaline.

10. A normally gum forming cracked gasoline stabilized by containing a small proportion of peri-monoxynaphthalene.

11. A normally gum forming cracked gasoline stabilized by containing a small proportion of di-alpha-naphthol.

12. The motor fuel of claim 7 wherein the said oxidation product is present in amounts ranging from 0.0005 to 0.01 per cent.

13. The motor fuel of claim 11 in which the di-alpha-naphthol is present in amounts totaling a few ten thousandths of 1 per cent by weight.

EUGENE AYRES.